(12) United States Patent
Magnan et al.

(10) Patent No.: US 8,766,585 B2
(45) Date of Patent: Jul. 1, 2014

(54) DEVICE FOR CONTROLLING AN ON-BOARD APPARATUS

(75) Inventors: Sébastien Magnan, Paris (FR); Jean-François Weibel, Paris (FR); Philippe Gouze, Paris (FR)

(73) Assignee: Sagem Defense Securite, Paris (FR)

( * ) Notice: Subject to any disclaimer, the term of this patent is extended or adjusted under 35 U.S.C. 154(b) by 175 days.

(21) Appl. No.: 13/574,986

(22) PCT Filed: Jan. 20, 2011

(86) PCT No.: PCT/EP2011/000214
§ 371 (c)(1),
(2), (4) Date: Aug. 3, 2012

(87) PCT Pub. No.: WO2011/089002
PCT Pub. Date: Jul. 28, 2011

(65) Prior Publication Data
US 2012/0293286 A1    Nov. 22, 2012

(30) Foreign Application Priority Data
Jan. 25, 2010   (FR) ...................................... 10 50458

(51) Int. Cl.
G05B 19/40     (2006.01)
H02P 8/14      (2006.01)

(52) U.S. Cl.
CPC ........................................ H02P 8/14 (2013.01)
USPC ............................ 318/685; 318/671; 318/560

(58) Field of Classification Search
CPC ......................................................... H02P 8/14
USPC .......................................... 318/685, 671, 560
See application file for complete search history.

(56) References Cited

U.S. PATENT DOCUMENTS 4,513,235 A     4/1985   Acklam et al.
7,637,360 B2 *  12/2009  Carlson et al. ............. 188/267.2

FOREIGN PATENT DOCUMENTS

DE     10 2009 017081 A1    10/2009
EP          1 308 819 A1    5/2003

* cited by examiner

*Primary Examiner* — David Luo
(74) *Attorney, Agent, or Firm* — Muncy, Geissler, Olds & Lowe, P.C.

(57) ABSTRACT

A control device (1) for controlling on-board equipment has a mount (5) having hinged thereto at least one drive lever (2) movable between two extreme positions, and also including a magnetic friction member (3) connected to the lever (2) and opposing resistance to movement thereof.

14 Claims, 2 Drawing Sheets

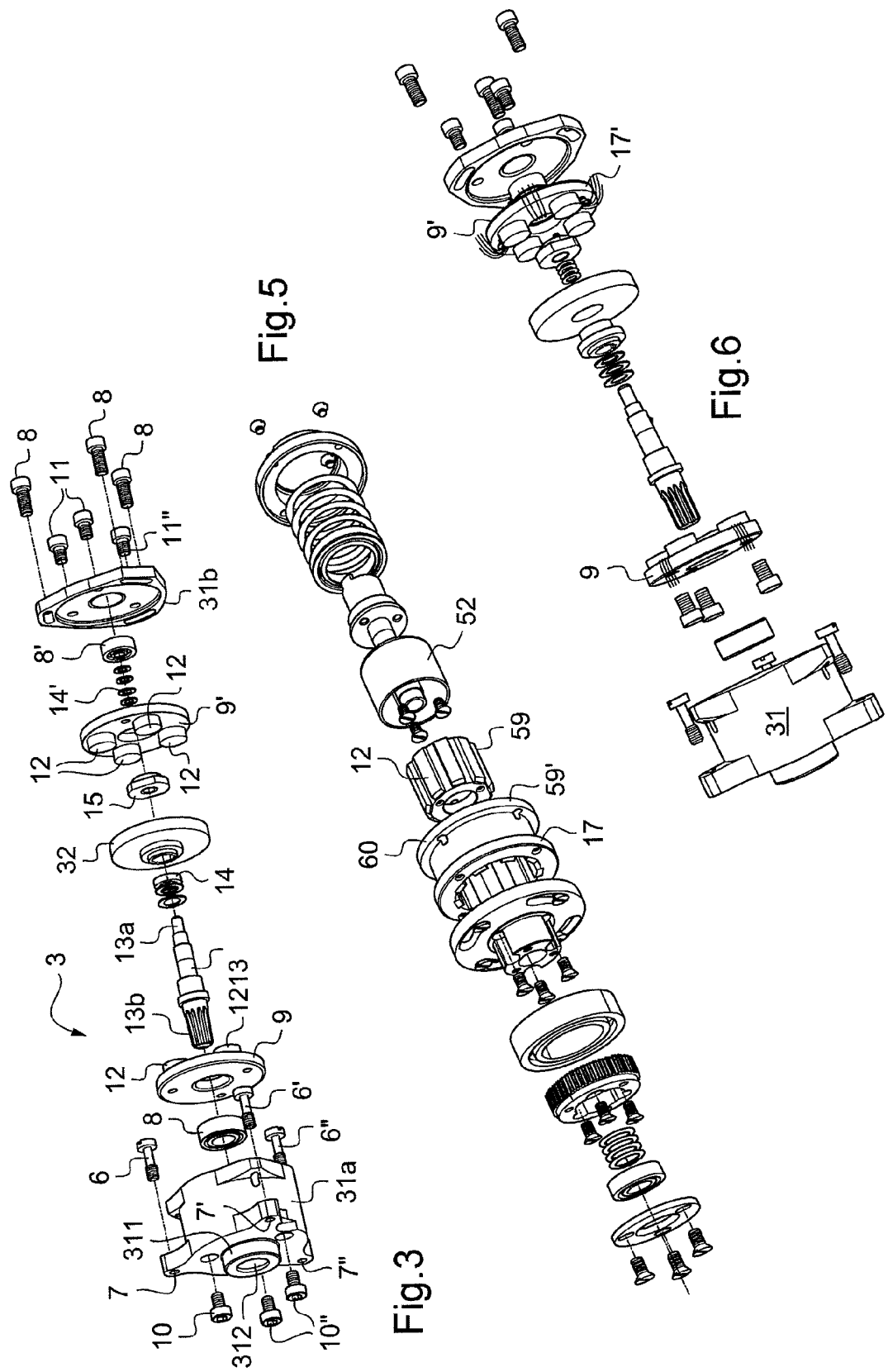

DEVICE FOR CONTROLLING AN ON-BOARD APPARATUS

FIELD OF THE INVENTION

The present invention relates to a device for controlling on-board equipment, in particular a device providing force feedback, e.g. a device for controlling an aircraft engine that generally comprises a mount having pivotally mounted thereon a code wheel and a main lever, referred to as a "throttle" lever, that is arranged to turn the code wheel. The throttle lever is movable relative to the mount between a rest position and a maximum-actuation position.

BACKGROUND OF THE INVENTION

The ergonomics, the comfort in use of the control device by the operator, specifically by the pilot when the device is for an aircraft, are criteria that need to be taken into account when designing a device of this type. It is useful for the pilot to feel a force when handling the equipment, specifically for controlling the engine, on moving the throttle lever towards its maximum-actuation position. That is why the control device is generally designed to include friction brake means, which means are generally mechanical and serve to oppose in controlled manner the movements that are imparted to the control device by the operator, e.g. to the throttle lever by the pilot.

Such friction brake means may be systems that make use of a friction element, such as a friction pad, that rubs against an element secured to the control device, thereby opposing resistance to the force applied by the pilot to said device. Such friction systems are effective, they give a good sensation of force return to the operator, and they are reliable, however they are not without drawbacks: they wear over time, and therefore need to be replaced periodically, or at least to be verified. They are not completely insensitive to variations in temperature, they give the operator a feeling of friction that could be improved, and finally, their response depends on the speed with which the operator moves the control device.

OBJECT AND SUMMARY OF THE INVENTION

The object of the invention is to provide means for improving the comfort in use of a device for enabling an aircraft to be controlled by an operator, and that can in particular mitigate at least one of the above-mentioned drawbacks of existing systems, while guaranteeing the same levels of reliability and safety.

To this end, the invention provides a control device for controlling on-board equipment (e.g. on board an aircraft), said device comprising a mount having hinged thereto at least one drive lever movable between two extreme positions, said device also comprising a magnetic friction member connected to the lever (or at least to one of them if there is a plurality of levers) and opposing resistance to the movement thereof.

Using a magnetic friction member is most advantageous for several reasons. Braking is performed on the movement of the control device without friction between mechanical parts, and thus without significant wear. In addition, the braking torque exerted by a magnetic friction member is completely or almost completely insensitive to temperature differences, assuming that the materials that generate the magnetic field are appropriately chosen. Furthermore, the braking torque is completely or almost completely independent of the speed with which the operator actuates the control device. Finally, it is found that the sensation of force opposing movement as felt by the operator is more agreeable than with systems using a friction strip since it is softer and smoother.

As with mechanical friction, it should be observed that the magnetic friction member also ensures that when the operator is not handling the lever, the lever does indeed remain in the selected position: this avoids any unwanted and inappropriate movement of the lever when the operator desires to keep it in a given position, even in the presence of vibration or under the effect of the acceleration of the vehicle on which the device is mounted.

Advantageously, the magnetic friction member has a support, or a plurality of facing supports—in particular two facing supports—which supports carry components suitable for acting together to generate a magnetic field between said supports—when there is a plurality of them—, and also a ferromagnetic rotor, in particular a rotor placed between the supports—when there is a plurality of supports—, which rotor is movable about an axis and connected to the lever.

The movement of the rotor relative to the components that generates the non-uniform magnetic field gives rise to a hysteresis cycle path for the ferromagnetic material of the rotor, thereby causing energy to be dissipated in the rotor and thus generating forces that oppose movement of the rotor. The energy dissipated in the rotor disk is proportional to its movement, so the forces that oppose movement are thus independent of speed.

In a first variant, the supports are plates substantially perpendicular to the axis of rotation and the rotor comprises a plate that extends parallel to said plates, and lies between them.

The various characteristics of the magnetic field that is created in this way can be adjusted, e.g. by selecting the type of component, the distance between the supports, or indeed the angular offset of the components of each of the supports. In particular for the purpose of simplifying design, it is preferable for the control device to be such that the axis of rotation of the rotor and the pivot axis of the lever coincide.

In a second variant, the magnetic friction member comprises a first support that is received in a second support and that co-operates therewith to define an annular space receiving a rotor-forming ferromagnetic sleeve.

The components suitable for generating a magnetic field may be elements that generate a permanent magnetic field, in particular permanent magnets, disposed on each of the supports and optionally angularly offset in appropriate manner relative to one another.

The components suitable for generating a magnetic field may comprise elements that generate a variable magnetic field. They may thus comprise at least one coil mounted on at least one of the supports co-operating with at least one component suitable for generating a permanent magnetic field mounted on at least one of the supports, and in particular on the other support.

The use of such elements ensures that the device can have a structure that is particularly simple. For the person handling the control device, the use of a coil makes it possible to create "notches" by causing the magnetic field to vary during the movement of the device, and the positioning of the notches can be adjusted, e.g. for the purpose of providing at least one notch that defines the position for the lowest fuel consumption when the device is used for controlling aircraft engines.

As mentioned above, the orientation and/or the intensity of the magnetic field created between the support(s) are adjustable depending on the size, the relative angular position of the components generating the magnetic field, the distance between the supports, the type of coil, etc.

It is thus possible to adjust the braking force by moving the supports carrying the components suitable for acting together to generate the magnetic field angularly relative to each other in such a manner as to modify the path length of the eddy currents in the rotor, and thus to modify the magnitude of the opposing electromagnetic force (emf). Thus, the magnets or coils are fastened in permanent manner on the supports, and subsequent adjustment is applied only to the relative positioning between the supports, which is simple.

The rotor is preferably secured to a shaft that is itself connected to the lever.

For example, the rotor is constrained to turn with the shaft that is itself connected to the lever by a motion transmission system, in particular a gear type system or a belt transmission system, or directly by a pivot shaft of the lever that extends the shaft of the rotor.

The magnetic friction member may comprise a casing mounted on the mount and defining a housing for the plates or the supports and the rotor, thereby enabling those elements and the components that generate the magnetic field to be protected from magnetic shocks, from dust, and from ferromagnetic metallic particles that might be found in the environment of the magnetic friction member.

The casing preferably comprises two complementary casing portions that are fastened to each other in order to define the housing, each of the supports being mounted against one of the portions of the casing. The rotor may thus be mounted on a shaft arranged in the housing defined by the casing and projecting therefrom via its end that is connected to the lever.

The portions of the casing are then advantageously angularly adjustable relative to each other about the axis of rotation of the rotor, thereby enabling the braking force to be adjusted.

BRIEF DESCRIPTION OF THE DRAWINGS

Other characteristics and advantages of the invention appear on reading the following description of particular, non-limiting embodiments of the invention.

Reference is made to the accompanying drawings, in which:

FIG. 3 is an exploded diagrammatic view of a magnetic friction member in accordance with a first embodiment of the invention;

FIG. 5 is a diagrammatic exploded view of the magnetic friction member of FIG. 4; and FIG. 6 is an exploded diagrammatic view of a third embodiment of the magnetic friction member of the invention.

MORE DETAILED DESCRIPTION

Figure 1:
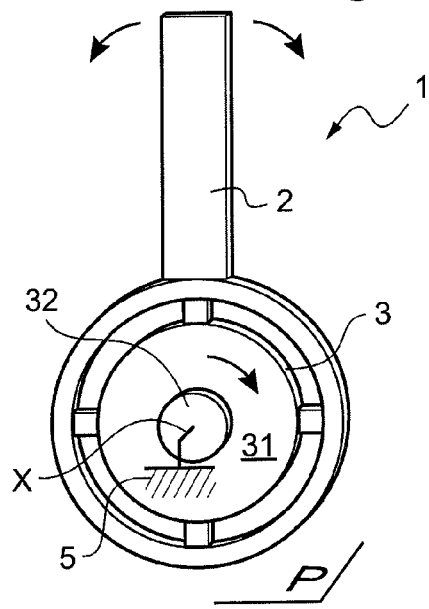
FIG. 1 is a diagrammatic side view of a control device for controlling aircraft equipment and fitted with a magnetic friction member in a first variant of the invention.
Figure 2:
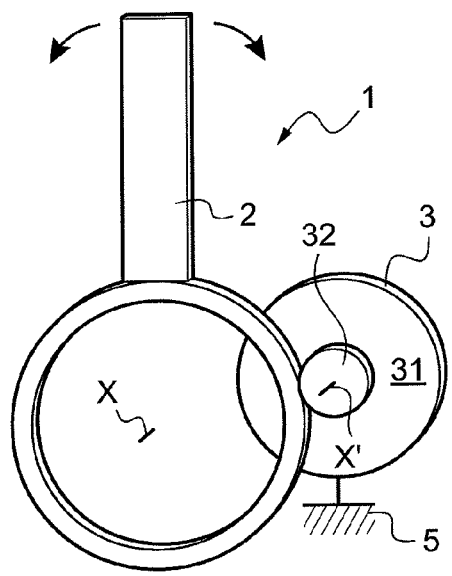
FIG. 2 is a diagrammatic side view of a control device for controlling aircraft equipment and fitted with a magnetic friction member in a second variant of the invention.

The figures, and in particular FIGS. 1 to 2, are highly diagrammatic, and the elements shown are not necessarily mutually to scale in order to make the figures easier to read. The reference for any given element is conserved in all of the figures in which it appears.

The fuel control device to which the invention applies and as described in the following embodiments is arranged to control the thrust from an aircraft engine with the help of a throttle lever.

FIG. 1 shows a control device 1 in a first variant comprising a throttle lever 2 suitable for being moved manually between two extreme positions by pivoting about an axis X relative to a mount represented by shading 5. The device includes a magnetic friction member 3 that comprises, as described in greater detail below with reference to FIG. 3 et seq., a casing 31 defining a housing having plates carrying components that generate a magnetic field and a ferromagnetic rotor 32. The casing 31 is connected to the throttle lever 2 itself, while the rotor 32 is connected to the mount 5 of the throttle lever 2. Under such circumstances, the structure 2, 3 is compact: the axis of rotation of the rotor 32 coincides with the axis of rotation X of the lever 2 and the friction member 3 lies substantially on a vertical midplane P (as shown in the figure) that is the same as the plane of the throttle lever 2.

FIG. 2 shows a second variant in which, in this variant, the casing 31 is connected to the mount 5 for the throttle lever 2, while the rotor 32 is connected to the throttle lever 2 via a gear connection. The axes of rotation of the throttle lever 2 and of the rotor 32 remain parallel (axes X and X'), but in this variant they are offset relative to each other.

FIG. 3 is a detail view of a friction member 3 in a first embodiment of the invention. It comprises a casing 31 housing two plates 9 and 9' in the form of disks that are pierced in their centers, that are substantially identical in size, and that are placed around a common central axis. Each of these two plates 9 and 9' has four magnets 12 on its face facing the other plate. A rotor 32 of ferromagnetic compound is secured to a shaft 13 by washers 14 and a nut 15 that is screwed onto the shaft from its end 13a. The shaft 13 also passes through the two plates 9 and 9', and its other end 13b in the assembled position projects from the casing 31 via an opening 312 that is formed in the end wall of a portion 31a of the casing that receives a bearing 8. The casing 31 is made up of a first portion 31a defining a housing and a second portion 31b that closes the housing by being screwed onto the portion 31a by means of screws 8 passing via both portions. The entire casing 31 is designed to be fastened to the mount (not shown) by means of screws 6, 6', 6" passing through fastening sockets 7, 7', 7" regularly distributed around the outside of the portion 31a of the casing, while said screws pass through oblong holes extending over circular arcs in the portion 31b. The shape of the holes receiving the screws 6, 6', 6" in the casing portion 31b allows said portion to move angularly relative to the casing portion 31a about the axis X and thus allows the angular positions of the magnets 12 of the plate 9 to be adjusted relative to the positions of the magnets of the plate 9'. This adjustment of angular orientation serves to adjust the braking force. The casing 31 defines a housing that includes an open cylindrical cavity 311 in the end wall of the portion 31a, which cavity is suitable for housing the bearing 8. The plate 9 is screwed to the portion 31a of the casing 31 by screws 10, 10', 10" passing through openings provided for this purpose in the end wall of the portion 31a so as to be received in tapped wells formed correspondingly in the annular portion of the plate. In analogous manner, the plate 9' is screwed to the cover 31b of the casing by screws 11, 11', 11". The end 13a of the shaft is mounted to pivot in the cover 31b of the casing via a bearing 8'.

Figure 4:
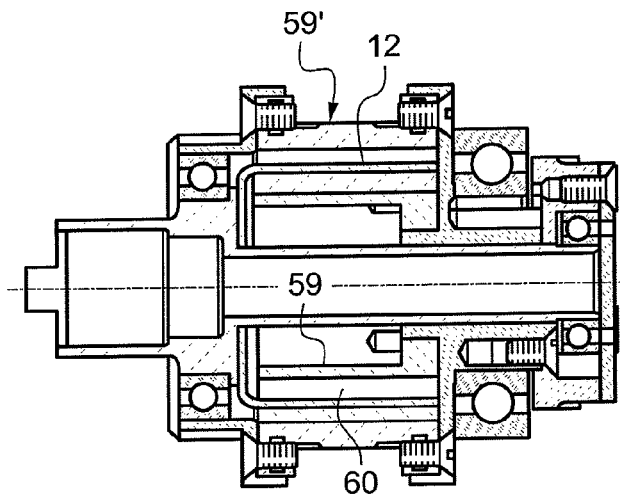
FIG. 4 is a diagrammatic axial section view of a second embodiment of the magnetic friction member of the invention.

FIGS. 4 and 5 show a friction member in a second embodiment of the invention. In this embodiment there is no longer a pair of plates, but a first support 59 that is received in a tubular second support 59' and that co-operates therewith to define an annular space 60 that receives a rotor-forming ferromagnetic sleeve 52. The first support 59 is provided with magnets 12 while the second support 59' has coils 17. This device is assembled in a manner analogous to that of the device constituting the first embodiment.

FIG. 6 shows a friction member in a third embodiment of the invention, similar to the first embodiment shown in FIG. 3. The difference lies in the fact that coils 17' are associated with the plate 9'.

The use of coils 17 and 17' enables "notches" to be generated that can be felt by the pilot while moving the throttle lever, and it is possible to adjust the stroke of these notches as a function of various parameters such as the load of the airplane or the distance it is to travel. It is thus possible to provide a notch that corresponds to a position for minimizing fuel consumption.

Naturally, the invention is not limited to the embodiments described but covers any variant coming within the ambit of the invention as defined by the claims.

In particular, other applications may be envisaged for the control device of the invention which is not restricted in any way to controlling an aircraft engine.

Mounting the control device in a casing, as in the first embodiment, is optional, as is the possibility of adjusting the opposing force.

The invention claimed is:

1. A control device for controlling on-board equipment, said device comprising a mount having at least one drive lever hinged thereto that is movable between two extreme positions, and a magnetic friction member that is connected to the lever and that opposes resistance to movement thereof, the magnetic friction member having one or more supports carrying components suitable for acting together to generate a magnetic field, in particular between said supports when there is a plurality of supports, and a ferromagnetic rotor, which rotor is arranged in particular between the supports when there is a plurality of supports, is movable about an axis (X), and is connected to the lever, wherein the magnetic field is adjusted by moving the supports carrying the components that are suitable for acting together to generate the magnetic field angularly relative to each other.

2. The control device according to claim 1, wherein the supports are plates substantially perpendicular to the axis of rotation, and the rotor comprises a plate extending parallel to said plates and lying between them.

3. The control device according to claim 2, wherein the magnetic friction member (3) comprises a first support that is received in a second support and that co-operates therewith to define an annular space receiving a rotor-forming ferromagnetic sleeve.

4. The control device according to claim 2, wherein the axis of rotation of the rotor and the pivot axis of the lever coincide or are parallel to each other, or are arranged otherwise.

5. The control device according to claim 2, wherein the components suitable for generating a magnetic field comprise elements generating a permanent magnetic field that are arranged on each of the supports and that are angularly offset relative to one another.

6. The control device according to claim 2, wherein the components suitable for generating a magnetic field comprise elements for generating a variable magnetic field, in particular at least one coil mounted on at least one of the supports and co-operating with at least one component suitable for generating a permanent magnetic field mounted on at least one of the supports.

7. The control device according to claim 2, wherein the rotor is secured to a shaft that is itself connected to the lever.

8. The control device according to claim 2, wherein the rotor is secured to a shaft that is itself connected to the lever by a movement-transmitter system, in particular of the type comprising a gear system or a belt transmission system, or directly by a pivot shaft of the lever extending the shaft of the rotor.

9. The control device according to claim 2, wherein the magnetic friction member comprises a casing mounted on the mount and defining a housing for the supports and for the rotor.

10. The control device according to claim 9, wherein the casing comprises two complementary casing portions that are fastened to each other to define a housing, each of the supports being mounted against one of the portions of the casing.

11. The control device according to claim 9, wherein the rotor is mounted on a shaft arranged in the housing defined by the casing and projecting therefrom via its end connected to the lever.

12. The control device according to claim 11, wherein the portions of the casing are angularly positionable relative to each other about the axis of rotation of the rotor.

13. The control device according to claim 1, wherein the orientation and/or the intensity of the magnetic field created by the magnetic friction member is/are adjustable.

14. The control device according to claim 1, wherein said control device is a device for controlling the thrust of an aircraft engine.

* * * * *